United States Patent
Lopez et al.

(10) Patent No.: US 11,317,260 B2
(45) Date of Patent: Apr. 26, 2022

(54) METHODS AND ARRANGEMENTS FOR WLAN COMMUNICATION OF MULTI-USER DATA IN A SINGLE DATA PACKET

(71) Applicant: Telefonaktiebolaget LM Ericsson (publ), Stockholm (SE)

(72) Inventors: Miguel Lopez, Solna (SE); Bo Hagerman, Tyresö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/539,822

(22) PCT Filed: Jan. 27, 2015

(86) PCT No.: PCT/SE2015/050079
§ 371 (c)(1),
(2) Date: Jun. 26, 2017

(87) PCT Pub. No.: WO2016/122359
PCT Pub. Date: Aug. 4, 2016

(65) Prior Publication Data
US 2017/0373976 A1  Dec. 28, 2017

(51) Int. Cl.
*H04W 4/38* (2018.01)
*H04W 84/12* (2009.01)
(Continued)

(52) U.S. Cl.
CPC ............ *H04W 4/38* (2018.02); *H04B 7/04* (2013.01); *H04L 47/10* (2013.01); *H04W 4/06* (2013.01);
(Continued)

(58) Field of Classification Search
None
See application file for complete search history.

(56) References Cited

U.S. PATENT DOCUMENTS 8,599,803 B1  12/2013  Zhang et al.
8,867,642 B1 * 10/2014  Syed .................. H04W 28/065
                                                  375/260
(Continued)

FOREIGN PATENT DOCUMENTS

EP         2395678 A1    12/2011
WO    2005112355 A1    11/2005
(Continued)

OTHER PUBLICATIONS

Abraham, Santosh et al., "Relays for 802.11ah," IEEE 802.11-12/1323r0, Nov. 2012, https://mentor.ieee.org/802.11/dcn/12/11-12-1323-00-00ah-relay.pptx, IEEE, 14 slides.
(Continued)

*Primary Examiner* — Gregory B Sefcheck
*Assistant Examiner* — Suk Jin Kang
(74) *Attorney, Agent, or Firm* — Sage Patent Group

(57) ABSTRACT

A radio network node, e.g. an Access Point, and wireless devices are comprised in a Wireless Local Area Network. The radio network node is configured to: Identify wireless devices associated with common properties of one or more predetermined property types. Obtain data intended for transmission to the identified wireless devices, where different parts of the data is intended for transmission to different wireless devices. Form a single data packet based on said common properties and comprising the obtained data. The single data packet is associated with a packet type directed to deliver data to only a single wireless device. Transmit the single data packet on a communication channel being accessed by all of the identified wireless devices.

30 Claims, 6 Drawing Sheets

(51) Int. Cl.
| | |
|---|---|
| H04W 4/06 | (2009.01) |
| H04B 7/04 | (2017.01) |
| H04L 12/801 | (2013.01) |
| H04L 27/00 | (2006.01) |
| H04L 47/10 | (2022.01) |

(52) U.S. Cl.
CPC ..... *H04W 84/12* (2013.01); *H04L 2027/0095* (2013.01)

(56) References Cited

U.S. PATENT DOCUMENTS

| | | | | |
|---|---|---|---|---|
| 10,327,226 | B2* | 6/2019 | Seok | H04L 5/0053 |
| 10,524,290 | B1* | 12/2019 | Chu | H04W 74/0816 |
| 2006/0056443 | A1* | 3/2006 | Tao | H04L 1/1628 370/462 |
| 2006/0072615 | A1* | 4/2006 | Narad | H04L 12/2854 370/474 |
| 2007/0101020 | A1* | 5/2007 | Lin | H04L 1/1607 709/238 |
| 2007/0223527 | A1* | 9/2007 | Shao | H04L 1/1628 370/468 |
| 2008/0049654 | A1* | 2/2008 | Otal | H04W 28/06 370/311 |
| 2011/0150004 | A1* | 6/2011 | Denteneer | H04L 5/0023 370/476 |
| 2012/0281774 | A1* | 11/2012 | Lee | H04L 27/28 375/260 |
| 2012/0327838 | A1* | 12/2012 | Seok | H04W 4/06 370/312 |
| 2013/0142184 | A1* | 6/2013 | Wang | H04L 5/0053 370/338 |
| 2013/0177096 | A1* | 7/2013 | Park | H04B 7/0452 375/267 |
| 2013/0229996 | A1* | 9/2013 | Wang | H04W 72/0413 370/329 |
| 2013/0315141 | A1* | 11/2013 | Homchaudhuri | H04W 88/06 370/328 |
| 2013/0336306 | A1* | 12/2013 | Sohn | H04B 7/0452 370/338 |
| 2014/0301383 | A1* | 10/2014 | Sohn | H04B 7/0452 370/338 |
| 2015/0092659 | A1* | 4/2015 | Syed | H04L 5/0094 370/312 |
| 2015/0124689 | A1* | 5/2015 | Merlin | H04L 5/0055 370/312 |
| 2015/0222339 | A1* | 8/2015 | Park | H04B 7/0452 375/267 |
| 2015/0244448 | A1* | 8/2015 | Seok | H04W 48/12 370/315 |
| 2015/0341102 | A1* | 11/2015 | Erceg | H04B 7/0452 370/338 |
| 2015/0381676 | A1* | 12/2015 | Seok | H04W 4/06 370/315 |
| 2016/0037484 | A1* | 2/2016 | Kwon | H04W 72/005 370/312 |
| 2016/0119453 | A1* | 4/2016 | Tian | H04L 5/04 370/338 |
| 2016/0134406 | A1* | 5/2016 | Chu | H04L 5/0037 370/329 |
| 2016/0142122 | A1* | 5/2016 | Merlin | H04B 7/0617 375/267 |
| 2016/0156396 | A1* | 6/2016 | Stacey | H04B 7/0452 370/330 |
| 2016/0156438 | A1* | 6/2016 | Sun | H04W 72/044 370/330 |
| 2016/0165589 | A1* | 6/2016 | Chu | H04L 5/0007 370/329 |
| 2016/0165607 | A1* | 6/2016 | Hedayat | H04W 72/0453 370/338 |
| 2016/0173662 | A1* | 6/2016 | Seok | H04W 84/12 370/252 |
| 2016/0174226 | A1* | 6/2016 | Porat | H04L 5/0044 370/329 |
| 2016/0191127 | A1* | 6/2016 | Zhang | H04B 7/0669 370/329 |
| 2016/0192351 | A1* | 6/2016 | Kwon | H04W 72/0413 370/329 |
| 2016/0205672 | A1* | 7/2016 | Kim | H04L 27/2656 370/330 |
| 2016/0205686 | A1* | 7/2016 | Kim | H04L 27/2656 370/329 |
| 2016/0227569 | A1* | 8/2016 | Wang | H04W 72/0413 |
| 2016/0242195 | A1* | 8/2016 | Kwon | H04W 72/121 |
| 2016/0242233 | A1* | 8/2016 | Kang | H04B 7/0452 |
| 2016/0302057 | A1* | 10/2016 | Wang | H04L 5/0053 |
| 2016/0309477 | A1* | 10/2016 | Erceg | H04W 72/0453 |
| 2016/0309514 | A1* | 10/2016 | Kwon | H04W 72/005 |
| 2017/0026155 | A1* | 1/2017 | Seok | H04L 1/0008 |
| 2017/0041889 | A1* | 2/2017 | Liu | H04W 52/0229 |
| 2017/0048866 | A1* | 2/2017 | Chu | H04L 5/0037 |
| 2017/0099220 | A1* | 4/2017 | Adachi | H04B 1/44 |
| 2017/0155433 | A1* | 6/2017 | Seok | H04L 27/2602 |
| 2017/0163385 | A1* | 6/2017 | Merlin | H04L 5/0055 |
| 2017/0163776 | A1* | 6/2017 | Seok | H04L 5/0091 |
| 2017/0195915 | A1* | 7/2017 | Zhang | H04L 69/22 |
| 2017/0223665 | A1* | 8/2017 | Chun | H04B 7/0695 |
| 2017/0288748 | A1* | 10/2017 | Lou | H04B 7/0452 |
| 2017/0294953 | A1* | 10/2017 | Ghosh | H04W 72/042 |
| 2017/0302417 | A1* | 10/2017 | Chun | H04L 27/26 |
| 2017/0303280 | A1* | 10/2017 | Chun | H04L 27/26 |
| 2017/0310424 | A1* | 10/2017 | Chun | H04L 69/324 |
| 2017/0311310 | A1* | 10/2017 | Ryu | H04W 84/12 |
| 2018/0006789 | A1* | 1/2018 | Lee | H04B 7/0636 |
| 2018/0076860 | A1* | 3/2018 | Chu | H04W 72/1289 |
| 2018/0084566 | A1* | 3/2018 | Wang | H04W 72/0413 |
| 2018/0263047 | A1* | 9/2018 | Kim | H04L 5/0053 |

FOREIGN PATENT DOCUMENTS

| | | |
|---|---|---|
| WO | 2012144822 A2 | 10/2012 |
| WO | 2014116811 A1 | 7/2014 |

OTHER PUBLICATIONS

Aishwarya, V. et al., "IP based Wireless Sensor Networks with Web Interface," IEEE International Conference on Recent Trends in Information Technology (ICRTIT), Jun. 3-5, 2011, Anna University, Chennai, IEEE, pp. 462-466.

Author Unknown, IEEE P802.11ah™/D3.0: Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 6: Sub 1 GHz License Exempt Operation, Oct. 2014, New York, New York, IEEE, 611 pages.

Jisha, S. et al., "Fuzzy Rule Based Data Forwarding for Energy Efficient Wireless Sensor Networks in Industrial Control System," Fourth International Conference on Computing, Communications and Networking Technologies (ICCCNT), Jul. 4-6, 2013, Tiruchengode, India, IEEE, 6 pages.

International Search Report and Written Opinion for International Patent Application No. PCT/SE2015/050079, dated Oct. 21, 2015, 11 pages.

Author Unknown, "IEEE P802.11ah™/D2.0: Draft Standard for Information Technology—Telecommunications and information exchange between systems Local and metropolitan area networks—Specific requirements," Part 11: Wireless LAN Medium Access Control (MAC) and Physical Layer (PHY) Specifications, Amendment 6: Sub 1 GHz License-Exempt Operation, Jun. 2014, IEEE, 582 pages.

Supplementary European Search Report for European Patent Application No. 15880328.8, dated Dec. 6, 2017, 4 pages.

(56) References Cited

OTHER PUBLICATIONS

Examination Report for European Patent Application No. 15880328.8, dated Jan. 2, 2018, 9 pages.

* cited by examiner

METHODS AND ARRANGEMENTS FOR WLAN COMMUNICATION OF MULTI-USER DATA IN A SINGLE DATA PACKET

This application is a 35 U.S.C. § 371 national phase filing of International Application No. PCT/SE2015/050079, filed Jan. 27, 2015, the disclosure of which is incorporated herein by reference in its entirety.

TECHNICAL FIELD

Embodiments herein relate to methods, a radio network node and a wireless device in a Wireless Local Area Network (WLAN), such as based on the IEEE 802.11 standards, for transmitting data from the radio network node, e.g. a WLAN Access Point (AP) to the wireless device, e.g. a WLAN Station (STA).

BACKGROUND

Wireless networks based on the Institute of Electrical and Electronics Engineers' (IEEE) 802.11 standards are known as WiFi or WLAN networks. A STA is a wireless device, corresponding to a user, in the IEEE 802.11 standards, which e.g. together with other STAs are wirelessly connected to and communicate with and via an Access Point (AP) in the downlink (DL) and uplink (UL). The expression downlink (DL) is used for the transmission path from the AP to the STA. The expression uplink (UL) is used for the transmission path in the opposite direction i.e. from the STA to the AP.

The AP may thus serve one or more STAs. A simple WLAN may comprise one AP serving one STA but typically there are several STAs being served by the AP. The AP is in turn typically connect to one or more other networks, e.g. the Internet or a LAN.

The IEEE 802.11 standards, or simply 802.11, have developed and been extended over time and a recent development is the IEEE 802.11ah standard, which simply may be named 802.11ah below, see e.g. IEEE 802.11ah D3.0, "Part 11: Wireless LAN Medium Access Control (MAC) and Physical Layer (PHY) Specifications, Amendment 6: Sub 1 GHz License Exempt Operation". In the following, if not otherwise indicated, any reference to IEEE 802.11ah is to said version D3.0.

The 802.11ah standard has introduced a sub 1 GHz (S1G) Physical Layer (PHY) specification. The PHY in this specification provides support for 1 MHz, 2 MHz, 4 MHz, 8 MHz and 16 MHz channel bandwidths. In addition, three types of Physical Layer Protocol Data Unit (PPDUs) are defined:
S1G_1M for 1 MHz bandwidth.
SHORT for >=2 MHz bandwidth.
LONG, also for >=2 MHz bandwidth.

The LONG PPDU's provide functionality necessary to support Multi User Multiple Input Multiple Output (MU-MIMO), while the S1G_1M and SHORT PPDU's only support Single User MIMO (SU-MIMO).

S1G_1M PPDU's are important for coverage, and also because the spectrum available for 802.11ah is limited in some parts of the world. For example, in Japan, only 1 MHz channel bandwidths can be used.

In 802.11ah it has been introduced a new sensor type STA. It is a new type of non-AP STA, using data frames with small payload size and expected to have low duty cycle and low traffic volumes.

Many of the use cases for 802.11ah center on low cost devices, such as sensors, with low data rates and low complexity. Sensor type STAs and other low end STAs are expected to support only the mandatory 802.11ah features. In particular for 1 MHz bandwidth (BW), e.g. since coverage often is important for sensors, such STAs typically
Support only single stream transmissions.
Have only one TX antenna and one RX antenna.
Support only Binary Phase Shift Keying (BPSK) and Quadrature Phase Shift Keying (QPSK) modulations.

The preamble in single layer S1G_1M PPDU's occupies 14 Orthogonal Frequency Division Multiplexing (OFDM) symbols. The SIG field, containing the PHY header, occupies 6 OFDM symbols, labeled SIG-1 to SIG-6.

The OFDM symbols in a S1G_1M PPDU contain 24 data subcarriers. Hence, each BPSK modulated OFDM symbol can carry a payload of 3 bytes, while each QPSK modulated OFDM symbol can carry a payload of 6 bytes. The 802.11ah S1G_1M short MAC header is 16 bytes and the Cyclic Redundancy Check (CRC) is 4 bytes. Hence, if the payload is small, then the overhead may be quite significant.

The above-mentioned low-cost devices such as sensors are expected to typically have relatively small payload, e.g. just sending one or a few data values or just reporting they are active. It is also, at least in the long run with increasingly connected devices, in view of the Internet of Things (IoT) etc., expected to be a significant amount of such sensors connected at the same time, e.g. connected to a common WLAN AP.

As mentioned above, 802.11ah provides support for MU-MIMO for the LONG PPDU's and only for channel bandwidths larger than or equal to 2 MHz. This support is based largely on MU-MIMO in 802.11ac. It is fairly complex and requires a good deal of overhead.

Presently, MU-MIMO is an optional feature in the 802.11ac and 802.11ah standards. These MU-MIMO concepts are complex and cumbersome to implement and there are no, or almost no, commercial products implementing them. Hence, many existing and common ship-sets and chip-set designs, are not supporting MU-MIMO, which likely makes MU-MIMO implementations based on current 802.11ah expensive, making it in practice not so suitable for low cost devices, although 802.11ah targets mostly low cost devices. Therefore it is unclear whether the standardized version of MU-MIMO in present 802.11ah will ever be implemented and used in commercial products. Yet MU-MIMO would likely be advantageous in 802.11ah networks, since it alleviates medium contention problems and reduces latency. For example, by sending data for several users in the same packet, the airtime allocated to each user become less than if each user receives an individually addressed packet. If the airtime occupancy is reduced, then the probability of collision is reduced. Also, the users need to wait less to get their data, reducing latency.

IEEE 802.11-12/1323r0 "Relays for 802.11ah" proposes, in the context of relays, multiplexing of several users into a single packet. It is proposed to optimize the frame delivery from an AP to a relay STA by packing into a single Aggregated MAC Service Data Unit (A-MSDU), the MSDUs being addressed to several users. However, the packet is addressed to a single user, namely to the relay or AP. That is, even while several users' data are packed into one single packet, the packet as such is only destined to a single node and this does thus not target MU-MIMO.

Further, U.S. Pat. No. 8,599,803 discloses "Open loop multiple access for WLAN" where MAC frames intended for two or more users are packed into one packet.

Both IEEE 802.11-12/1323r0 and U.S. Pat. No. 8,599,803 suggest to multiplex several users in one packet, but do not disclose how it can be done with low overhead, which is desirable, nor do they disclose how to multiplex users in a way that is compatible with the 802.11ah packet formats. In addition, at least U.S. Pat. No. 8,599,803 explicitly excludes use of channel state information (CSI), which is undesirable as congestion and interference levels, as well as other channel characteristics, are time varying and typically are different for different users and therefore, without use of CSI, MU-MIMO transmissions will likely be inefficient.

In summary, a simple, low complexity version of MU-MIMO is desirable, in particular for sensor type STAs, but is presently lacking in 802.11ah. In particular, the 802.11ah standard does not include MU-MIMO for 1 MHz channel bandwidth.

SUMMARY

An object is to provide improvements with regard to MU-MIMO in WLANs, in particular such based on IEEE 802.11ah.

According to a first aspect of embodiments herein, the object is achieved by a method, performed by a radio network node, e.g. an Access Point, for transmitting data to wireless devices that are wirelessly connected to the radio network node. The radio network node and the wireless devices are comprised in a Wireless Local Area Network (WLAN). The radio network node identifies wireless devices that are associated with common properties being of one or more predetermined property types. radio network node obtains data intended for transmission to the identified wireless devices, where different parts of the data are intended for transmission to different wireless devices. Further, the radio network node forms a single data packet based on said common properties and comprising the obtained data, where the single data packet is associated with a packet type directed to deliver data to only a single wireless device. The radio network node transmits the single data packet on a communication channel being accessed by all of the identified wireless devices.

According to a second aspect of embodiments herein, the object is achieved by a computer program comprising instructions that when executed by a processing circuit causes the radio network node to perform the method according to the first aspect.

According to a third aspect of embodiments herein, the object is achieved by a data carrier comprising the computer program according to the third aspect.

According to a fourth aspect of embodiments herein, the object is achieved by a method, performed by a wireless device, for managing data from a radio network node. The wireless device is wirelessly connected to the radio network node. The radio network node and the wireless device are comprised in a WLAN. The wireless device receives, from the radio network node, a single data packet on a communication channel accessible by a group of wireless devices. The group comprises the wireless device and one or more further wireless devices and the wireless devices of the group are wirelessly connected to the radio network node. Further, the wireless device identifies the received single data packet as a single data packet that has been formed based on common properties that the wireless devices in said group are associated with. The common properties are of one or more predetermined property types. The single packet comprises data intended for receipt by said group of wireless devices, where different parts of the data are intended for receipt by different wireless devices. The single data packet is associated with a packet type directed to deliver data to only a single wireless device.

According to a fifth aspect of embodiments herein, the object is achieved by a computer program comprising instructions that when executed by a processing circuit causes the wireless device to perform the method according to the fourth aspect.

According to a sixth aspect of embodiments herein, the object is achieved by a data carrier comprising the computer program according to the fifth aspect.

According to a seventh aspect of embodiments herein, the object is achieved by a radio network node for transmitting data to wireless devices that are wirelessly connected to the radio network node and comprised in a WLAN. The radio network node is configured to be comprised in the WLAN and to: Identify wireless devices that are associated with common properties being of one or more predetermined property types. Obtain data intended for transmission to the identified wireless devices, where different parts of the are intended for transmission to different wireless devices. Form a single data packet based on said common properties and comprising the obtained data, which single data packet is associated with a packet type directed to deliver data to only a single wireless device. Transmit the single data packet on a communication channel being accessed by all of the identified wireless devices.

According to an eighth aspect of embodiments herein, the object is achieved by a wireless device for managing data from a radio network node. The wireless device is configured to be wirelessly connected to the radio network node and the radio network node is comprised in a WLAN. The wireless device is also configured to be comprised in the WLAN and further configured to: Receive, from the radio network node, a single data packet on a communication channel accessible by a group of wireless devices. The group comprises the wireless device and one or more further wireless devices wirelessly connected to the radio network node. Identify the received single data packet as a single data packet that has been formed based on common properties that the wireless devices in said group are associated with. The common properties are of one or more predetermined property types. The single data packet comprises data intended for receipt by said group of wireless devices, where different parts of the data are intended for receipt by different wireless devices. The single data packet is associated with a packet type directed to deliver data to only a single wireless device.

There are several advantages by, in the context of embodiments herein as discussed above, using a single data packet associated with a packet type directed to deliver data to only a single wireless device for delivery of multi-user data to wireless devices. That is, to deliver different data to different wireless devices in such single data packet. First, this enables much lower overhead than the conventional multi-user data packets since a shorter preamble portion is enabled. This may be particularly important for Machine Type of Communication (MTC) wireless devices, such as sensor devices, as it reduces energy consumption and e.g. resulting in prolonged battery life. Also, embodiments herein may be based on already existing single-user packet types and be implemented in devices already supporting such packet types. Thereby, by only small modifications, e.g. in software and/or hardware, these devices can be enabled to support also multi-user data and embodiments herein. Additionally, embodiments herein enable a multi-user packet based on the S1G_1M packet type in the IEEE 802.11ah standard, and thus enabling use of 1 MHz bandwidth for multi-user packets.

Hence improvement are provided with regard to MU-MIMO in WLANs, in particular WLANs based on IEEE 802.11ah.

BRIEF DESCRIPTION OF THE DRAWINGS

Examples of embodiments herein are described in more detail with reference to the appended schematic drawings, which are briefly described in the following.

DETAILED DESCRIPTION

Figure 1:
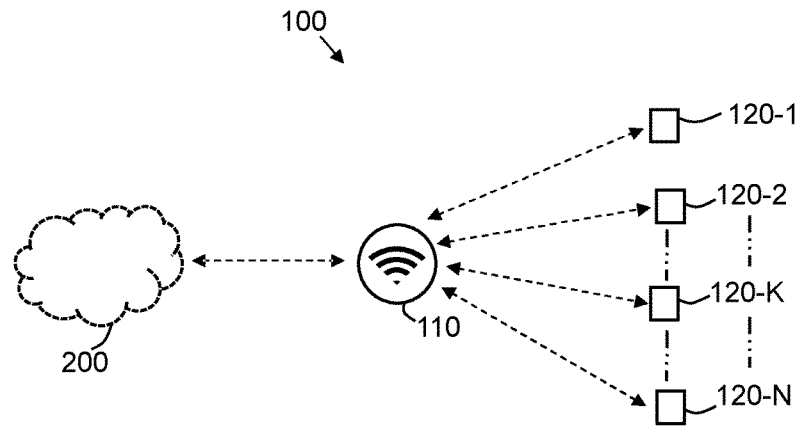
FIG. 1 is a block diagram schematically depicting an example of a WLAN in which embodiments herein may be implemented.

As a development towards embodiment herein, the problem indicated in the Background will first be further discussed.

STAs, which below are also referred to as wireless devices and sometimes also as users, in a WLAN network communicate through packets. All packets in WLANs start with a so-called preamble, which also may be named preamble portion in the following. The preamble contains training fields known to the receiver side, used for packet detection, frequency correction, channel estimation, etc. The preamble also contains a PHY header, which contains information necessary to decode the packet, such as the modulation and coding scheme and the number of spatial streams. WLANs may operate in single user mode and multi-user mode. In single user mode the data contained in a packet is directed to only one user, while in multi-user mode, the data contained in one packet may be directed to two or more users. The multi-user packets in WLAN networks use MIMO technology, with data for several users multiplexed over several spatial streams. Therefore they conventionally use a special multi-user preamble that allows channel estimation for all users. Such preamble is longer and introduces more overhead than the single-user preamble.

WLAN networks also support broadcast and multicast modes. In these modes one packet is intended for many users. That is, the same data is intended for a group of users. Recipient identifications (ID) fields in the preamble and a Medium Access Control (MAC) header may indicate that the packet is group addressed. Such group addressed broadcast/multicast packets employ a preamble that is common and the same for the group of users. Note that unlike multi-user packets, the data carried by broadcast/multicast packets is the same for all users.

Embodiments herein are based on realization how the S1G_1M type of packets in IEEE 802.11ah D3.0, as mentioned in the Background, or similar packet types in a WLAN, may be adapted and used to accomplish improvements with regard to MU-MIMO in WLANs, in particular for WLANs based on IEEE 802.11ah. When IEEE 802.11ah, or simply 802.11ah is mentioned in the following, it refers to version D3.0. In brief and in general, although exemplified and elaborated in detail below, embodiments herein may be explained as based on realization that existing WLAN packet types, such as the S1G_1M packet type, with a single-user preamble may be adapted and used to deliver multi-user data. Hence, according to embodiments herein it may be formed a single data packet, with a single-user preamble, for delivering different data to different (multiple) wireless devices. This is in contrast to existing packet types for multi-users which have a multi-user preamble, and also in contrast to broadcast or multicast packets that may be considered to have a single-user preamble but carrying only the same data to all recipients. Additionally, broadcast and multicast packets are intended for and associated with totally different usage scenarios than multi-user packets.

It may be noted that the S1G_1M preamble is the only preamble type in 802.11ah which does not possess an ID field as mentioned above. The ID field indicates the intended recipient of the PPDU. However, according to embodiments herein, also other packet types used in WLANs, e.g. the SHORT type in IEEE 802.11ah and thus also packet types with an ID field, directed to delivery of data to a single user, i.e. STA, may be adapted and used, not only the S1G_1M packet type.

FIG. 1 depicts a WLAN 100 as an example of a WLAN relevant for embodiments herein. As used herein, WLAN refers to a wireless communication network based on one or more of the Institute of Electrical and Electronics Engineers' (IEEE) 802.11 standards. Also as used herein, a WLAN may be considered synonymous with a WiFi-network. The WLAN 100 comprises a radio network node 110 e.g. an Access Point (AP) or a relay. The figure also shows connected wireless devices 120-1 . . . 120-N that are wirelessly connected to the radio network node 110 for communication over the WLAN 100. The wireless devices 120-1 . . . 120-N may thus be devices supporting WLAN and one or more applicable standards thereof. The wireless devices 120-1 . . . 120-N may e.g. be of sensor type. The radio network node 110 may be further connected to other network nodes of the wireless communication network 100 and/or to one or more further networks 200, e.g. the Internet or a Local Area Network (LAN), thereby e.g. enabling communication between one or more of the wireless devices 120-1 . . . 120-N and any network node virtually anywhere. In case e.g. one of the wireless devices is a sensor, it may be controlled by and/or deliver data to a mobile phone or computer connected to e.g. said one or more further networks 200, such as the Internet. The reference numerals 120-1 . . . 120-N, are intended to identify a total number of N wireless devices, where N is an integer value greater than or equal to 2. Part of the connected wireless devices 120-1 . . . 120-N is a (sub)group of wireless devices 120-1 . . . 120-K. This group will be explained further below in the context of embodiments herein. Similarly, the reference numerals 120-1 . . . 120-K, are intended to identify a total number of K wireless devices, where K is an integer value greater than or equal to 2 and less than or equal to N.

Attention is drawn to that FIG. 1 is only schematic and for exemplifying purpose and that not everything shown in the figure may be required for all embodiments herein, as will be evident to the skilled person. Also, a WLAN that in reality corresponds to the wireless communication network 100 may comprise several further network nodes, such as further AP(s), relay(s), repeater(s) etc., as realized by the skilled person, but which are not shown herein for the sake of simplifying.

Figure 2:
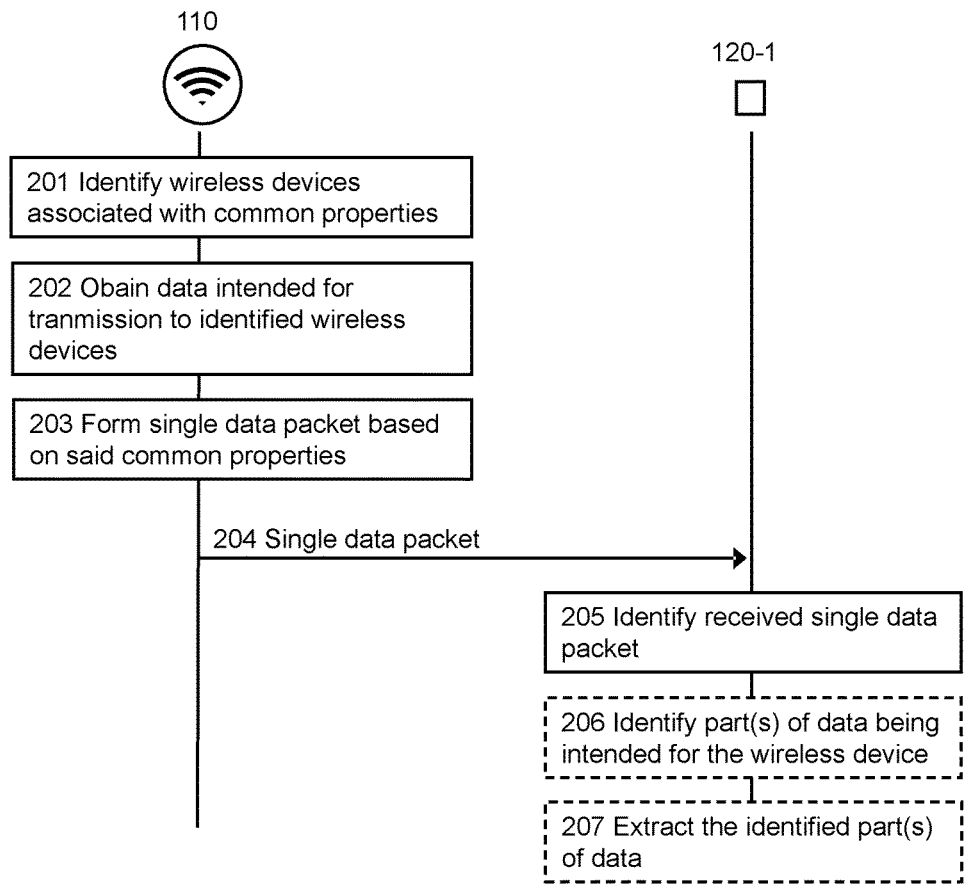
FIG. 2 is a combined signaling diagram and flowchart for describing embodiments herein.

FIG. 2 depicts a combined signaling diagram and flowchart and will be used to discuss examples of embodiments herein relating to a method for communicating datafrom the radio network node 110 to wireless devices, e.g. the wireless devices 120-1 . . . 120-K, in particular to the wireless device 120-1.

The method comprises the following actions, which actions may be taken in any suitable order and/or be carried out fully or partly overlapping in time when this is possible and suitable.

Action 201

The radio network node 110 identifies, among the wireless devices 120-1 . . . 120-N wirelessly connected to the radio network node 110, wireless devices 120-1 . . . 120-K that are associated with common properties being of one or more predetermined property types. That is, the identified wireless devices 120-1 . . . 120-K corresponds to the above-mentioned (sub)group of wireless devices 120-1 . . . 120-K. Each one of the wireless devices 120-1 . . . 120-K is thus associated with, e.g. having, said common properties in common with the rest of the wireless devices 120-1 . . . 120-K. For example, each one of the wireless devices 120-1 . . . 120-K may be associated with same properties as the rest of the wireless devices 120-1 . . . 120-K.

This identification corresponds to what may be named grouping of wireless devices elsewhere in the present disclosure. The identified wireless devices 120-1 . . . 120-K may be identified among all the connected wireless devices 120-1 . . . 120-N and/or among all wireless devices for which it has been identified to be data available for delivery by the radio network node 110.

Said one or more predetermined property types advantageously comprises a type based on downlink channel quality. Downlink channel quality e.g. depends on where the connected wireless devices 120-1 . . . 120-N are located etc. The network node 110 may get this information in the form of Channel State Information (CSI) received or inferred from each one of wireless devices 120-1 . . . 120-N. For example, the CSI may not be explicitly indicated by a wireless device, but the radio network node 110 can estimate, e.g. by using the so called reciprocity principle from electromagnetics, the quality of the downlink propagation from the measured quality of the uplink channel. Said type comprised in said one or more predetermined property types may thus be based CSI received from the wireless devices 120-1 . . . 120-N. The wireless devices 120-1 . . . 120-K associated with said common properties may be such that provide CSI values that are in a predetermined range that may indicate that the downlink channel quality is or shall be regarded to be the same. Such range may in turn be mapped to a certain Modulation and Coding Scheme (MCS) that should or shall be used for data transmitted to the wireless devices, e.g. in the pre-amble portion of the single data packet.

Said one or more predetermined property types may comprises one or more types for indicating one or more of the following:
channel bandwidth for wireless communication with the network node,
modulation and coding scheme (MCS),
number of space-time streams,
guard interval,
type of channel coding, and
employment regarding aggregation of Medium Access Control (MAC) Protocol Data Units (PDUs).

These types e.g. enable use of suitable already existing data packet types, such as the S1G_1M type in the IEEE 802.11ah standard.

Further, said one or more predetermined property types may comprises a type for indicating a type of wireless device. The type may e.g. indicate a wireless devices of a sensor type, such as mentioned above. The wireless devices 120-1 . . . 120-N may provide a type identification when connecting with the radio network node 110, which type identification may be used to identify wireless devices 120-1 . . . 120-N so that the identified wireless devices 120-1 . . . 120-K will be of the same type. Sensor types may be of particular interest to identify since sensors typically remain at one and the same location, and thereby typically have no or little changes in downlink channel quality. This makes them in particular suitable with embodiments herein where one of the predetermined property types is for indicating downlink channel quality and when using a data packet type indicating downlink channel quality. This is e.g. the case for packet data types with a preamble portion based on downlink channel quality, e.g. by indicating a MCS based on downlink channel quality as discussed above, and which MCS then typically is used for the data in the data portion. This may e.g. be the case when the data packet type is or is based on the S1G_1M type in the IEEE 802.11ah standard.

Moreover, said one or more predetermined property types may comprise a type for indicating an uplink communication channel used for receiving data packets from the radio network node 110. Also, said one or more predetermined property types may comprise a type for indicating that the packet type of the single data packet is supported. Note that this and/or other properties may follow implicitly by a communication standard and/or protocol being used. E.g. if embodiments herein are implemented only for IEEE 802.11ah, then all wireless devices 120-1 . . . 120-N communicatively connected with the radio network node 110 will e.g. support certain types of data packets, e.g. S1G_1M, and it also means that all wireless devices 120-1 . . . 120-N use the same uplink communication channel for receiving data packets from the radio network node 110. In such cases it is of course not needed perform any identification in this regard.

Action 202

The radio network node 110 obtains data intended for transmission to the identified wireless devices 120-1 . . . 120-K. Different parts of the data being intended for transmission to different wireless devices. For example, the data may have K different parts, a data part #1 thereof intended for transmission to the wireless device 120-1, etc., and a data part #K thereof intended for transmission to the wireless device 120-K.

Action 203

The radio network node 110 forms a single data packet based on said common properties and that comprises the obtained data. The single data packet is associated with a packet type directed to deliver data to only a single wireless device.

A packet type directed to deliver data to only a single wireless device may also be named a single-user packet type. The single data packet may be a Physical Layer Protocol Data Unit (PPDU) and the formed single data packet may correspond to a multi-user PPDU. As should be realized by the skilled person, a packet type is a type associated with a packet format that may be predetermined, e.g. standardized, and associated with rules regarding what kind of information a packet of the type shall contain in addition to data it shall carry, and rules for where and/or how said information and data shall be arranged in the packet.

The single data packet typically comprises a preamble portion and a data portion comprising the obtained data.

The preamble portion should be of a single-user type. As mentioned above, wireless devices may be referred to as users. The preamble portion being of a single-user type refers to a pre-amble portion of a type that indicates properties associated with only a single wireless device, e.g. a type used when all data in the data portion is common for one or more wireless devices or when the data portion relates to a only a single wireless device. A preamble portion of a single-user type may be a type with a format that follows any of the preamble formats defined for single-user packets, as hitherto specified in the IEEE 802.11 and its amendments.

The preamble portion may be valid for all the identified wireless devices 120-1 . . . 120-K based on that the identified wireless devices 120-1 . . . 120-K are associated with said common properties.

The data portion may comprise identifiers associated with the obtained data. The identifiers enabling each one of the identified wireless devices 120-1 . . . 120-K to identify which part or parts of the data that are intended for it. A packet type with this kind of data portion and a preamble portion being of the single-user type is an example of the packet type directed to deliver data to only a single wireless device. The identifiers may e.g. be MAC addresses of the identified wireless devices 120-1 . . . 120-K. The obtained data and identifiers associated therewith may be comprised in sub-data units, each associated with a header comprising one of the identifiers and with a data field comprising part of the data, which part is associated with said identifier comprised in the header. The sub-data units may be MAC Service Data Units (MSDUs).

Advantageously, at least one of the identifiers is arranged in the data portion as an identifier would have been arranged if the data portion would comprise data for a only a single wireless device. This facilitates compatibility with wireless devices that only support data in the data portion for a single wireless device, e.g. wireless devices already supporting single user data using said packet data type. That is, such wireless devices that may be already existing and/or in use but not implementing embodiments herein. Such wireless device may thus be able to read the single data packet, find one identifier and based on this take decision according to normal procedures, which typically would result in that the single data packet further will be ignored, under assumption that the data only concerns wireless devices supporting embodiments herein. In any case, a wireless device not supporting embodiments herein will be enabled to process the single data packet in a normal way.

Said one or more predetermined property types are advantageously based on what is indicated in the preamble portion according to a predetermined type of the single data packet. For example, in some embodiments the WLAN 100 is based on the IEEE 802.11ah standard and the single data packet is of a S1G_1M type. The S1G_1M type is an example of said predetermined type.

Further, the preamble portion may comprise an indicator indicating that the data portion comprises data for multiple wireless devices. This facilitates fast identification and decision by a wireless device, e.g. the wireless device 120-1, how to further process the single data packet after it has been received. It also makes it possible to implement and use embodiments herein in a context where some of the wireless devices 120-1 . . . 120-N only support single user data in packets of the same type as the single data packet, and where other support both or only multi-user data in the single data packet, i.e. support embodiments herein. The indicator should preferably be such that will be ignored by a wireless device only supporting single user data in packets of the same type as the single data packet. This may be accomplished by e.g. using spare bits, unused fields etc, in the preamble portion.

Action 204

The radio network node 110 transmits the single data packet on a communication channel being accessed by all of the identified wireless devices 120-1 . . . 120-K. The wireless device 120-1 receives, from the radio network node 110, the single data packet on said communication channel.

Action 205

The wireless device 120-1 identifies the received single data packet as being such single data packet, e.g. multi-user PPDU, that has been described above. For example that it is a single data packet that:

was formed based on common properties that the wireless devices 120-1 . . . 120-K are associated with, where said common properties are of said one or more predetermined property types, comprises data intended for receipt by the wireless devices 120-1 . . . 120-K, where different parts of the data is intended for receipt by different wireless devices, and is associated with a packet type directed to deliver data to only a single wireless device.

Action 206

The wireless device 120-1 may identify, based on one of the identifiers, as described above, the part or parts of the data that being intended for the wireless device 120-1.

Action 207

The wireless device 120-1 extracts the identified part or parts of data from the single data packet.

Several advantages for the WLAN 100 are enabled by, as in embodiments herein, using a single data packet of a packet type directed to deliver data to only a single wireless device for delivery of multi-user data to wireless devices, i.e. different data to different wireless devices. First, this enables much lower overhead than the conventional multi-user data packets since a shorter preamble portion is enabled. This may be particularly important for Machine Type of Communication (MTC) wireless devices, such as sensor devices, as it reduces energy consumption and e.g. resulting in prolonged battery life. Also, embodiments herein may be based on already existing single-user packet types and be implemented in devices already supporting these and that thereby, by only small modifications, e.g. in software and/or hardware, can be enabled to support also multi-user data and embodiments herein. If a packet data type is already supported for single user it is likely that the same hardware, e.g. chip set, can be used. This advantage exists regarding implementation of both the network node 110, e.g. a WLAN AP, and the wireless device 120-1, e.g. a WLAN STA. Existing hardware, e.g. chip-set, supporting the packet data type for single user may according to embodiments herein be adapted to also support and be possible to use for multi-user data and for implementing embodiments herein. An example of a preferred packet type is the S1G_1M type in the IEEE 802.11ah standard mentioned previously. Another example is the SHORT type in the same standard.

In conclusion, improvement are thus provided with regard to MU-MIMO in WLANs, in for particular WLANs based on IEEE 802.11ah.

Further advantages include for example:

Embodiments herein enable MU-MIMO for 802.11ah S1G_1M STAs supporting only the mandatory features of 1 MHz bandwidth according to the present specifications.

No changes are required in existing hardware, and the solution according to embodiments herein is to a very large extent compatible with existing 802.11ah TX and RX algorithms.

Only slight changes in the systemization of a receiver device, e.g. the wireless device 120-1, compared to an already existing receiver device may be required to implement embodiments herein, and the main signal processing blocks in the existing receiver device may be re-used.

Embodiments herein may be used in proprietary solutions, and/or may possibly be standardized in future amendments to the IEEE 802.11ah standard.

Embodiments herein enable lowered overhead compared to existing multi-user solutions and is well suited for sensor type STAs, which is a new type of low-duty cycle STA introduced in IEEE 802.11ah.

Embodiments herein are compatible with wireless devices not implementing embodiments herein, e.g. with already existing wireless devices, in the sense that embodiments herein are compatible with virtual carrier sensing mechanisms, associated with e.g. Network Allocation Vector (NAV) and Response Indication Deferral (RID), in the IEEE 802.11ah. Hence, an WLAN based on IEEE 802.11ah and supporting Basic Service Set (BSS) implementing embodiments herein may co-exist gracefully with other WLAN based on IEEE 802.11ah but not implementing embodiments herein and e.g. operating in a second IEEE 802.11ah BSS. Likewise, wireless devices operating within one IEEE 802.11ah BSS can co-exist with other wireless devices not implementing embodiments herein but operating within the same IEEE 802.11ah BSS.

Embodiments herein are HW compatible with low end STAs fulfilling only the mandatory requirements.

Auto-detection (between 1 MHz and 2 MHz) is not impacted by embodiments herein.

Embodiments herein enable S1G_1M with relatively small payloads, e.g. sensor type STAs, to quickly receive data, and enable reduction of collisions and freeing of the medium. Embodiments herein should be especially useful when the overhead, including e.g. preamble plus header and CRC, is a substantial amount of the single data packet, e.g. multi-user PPDU, according to embodiments herein.

Embodiments herein fit well with Target Wake Time (TWT), since the radio network node 110, e.g. AP, can schedule two STAs to wake up at the same time.

Embodiments herein may only requires slight changes in already existing transmitter and receiver algorithms. Basic synchronization & frequency correction, channel estimation, equalization, channel tracking, and demodulation blocks may be re-used.

Scheduling and/or pairing efforts by radio network node 110, e.g. AP, become rather modest in comparison with the scheduling/pairing required for MU-MIMO as standardized in 802.11ah.

Figure 3:
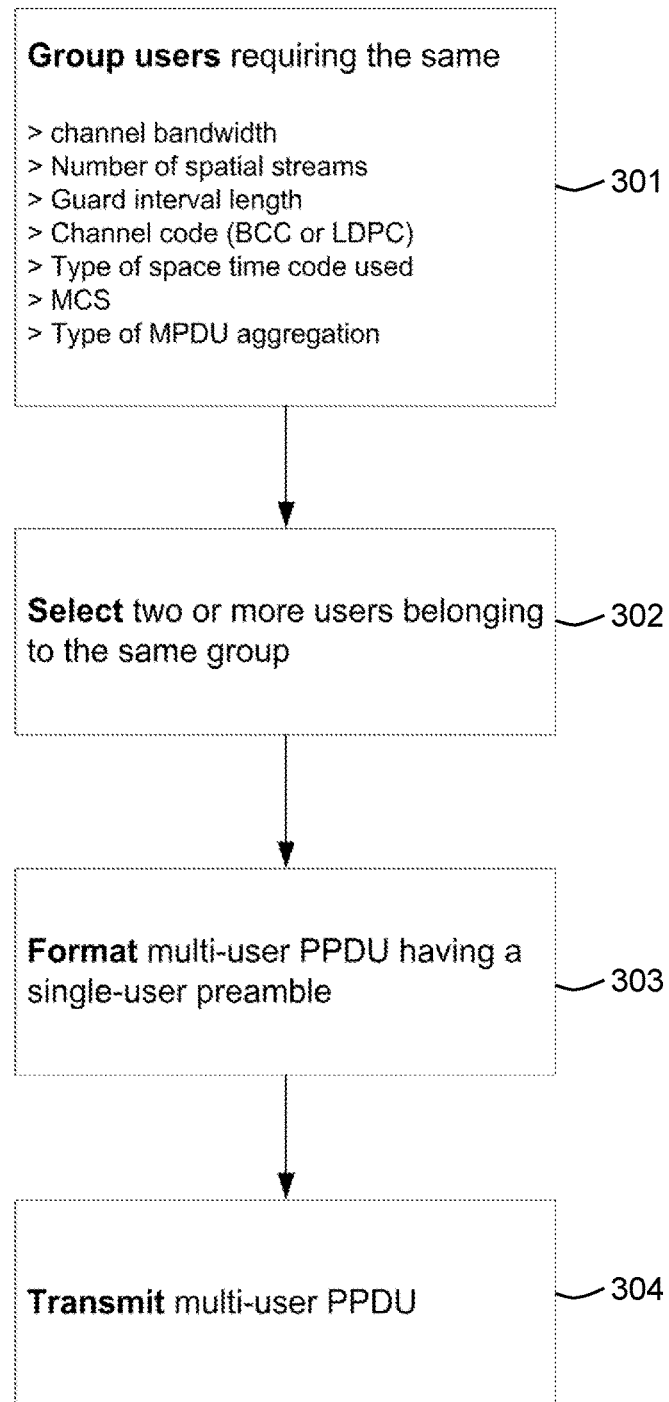
FIG. 3 is a flowchart schematically illustrating detailed embodiments of a method performed in a radio network node.
Figure 4:
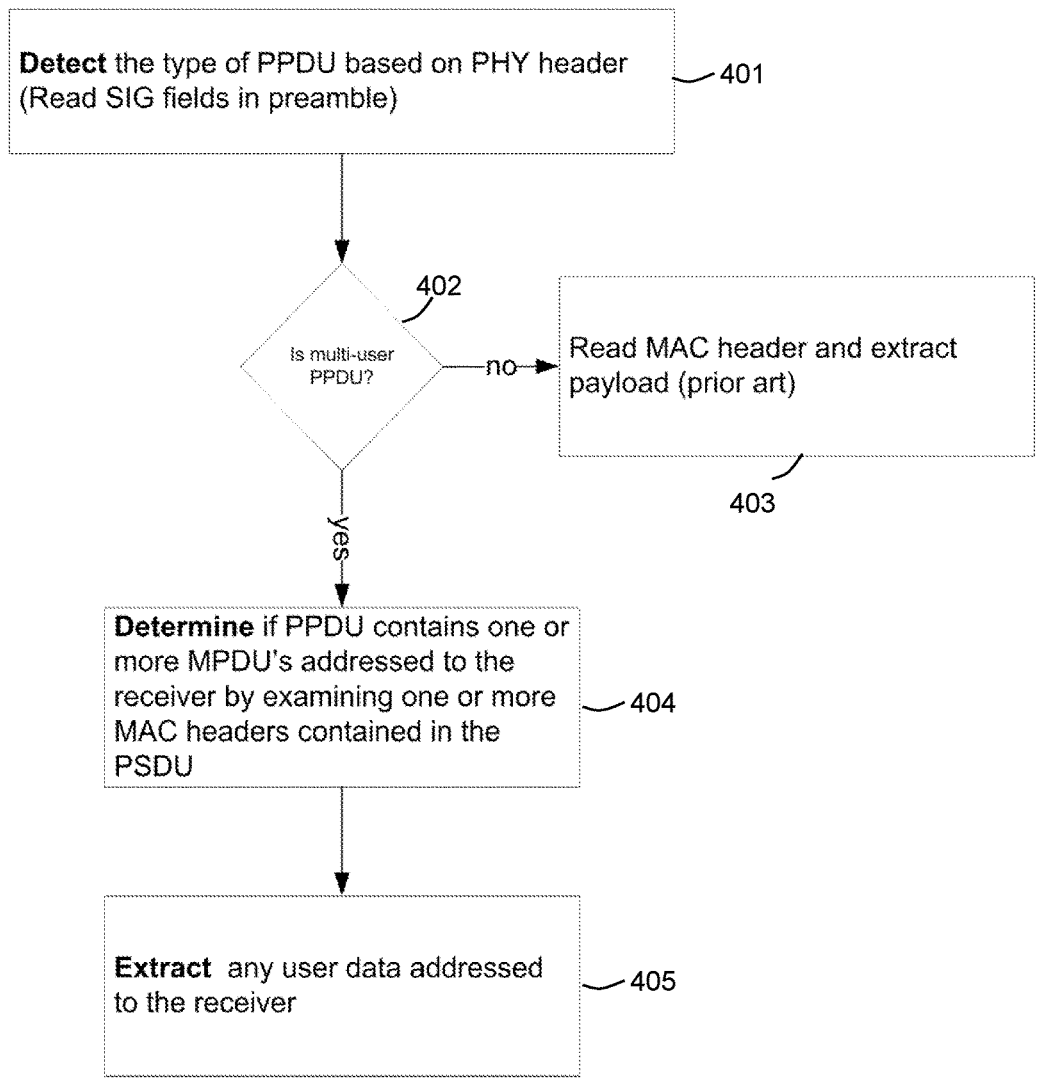
FIG. 4 is a flowchart schematically illustrating detailed embodiments of a method performed in a wireless device.

More detailed examples and embodiments will now be discussed with reference to FIG. 3 and FIG. 4, depicting exemplary actions of a transmitter device, e.g. the radio network node 110, and exemplary action of a receiver device, e.g. in the wireless device 120-1. Users and STAs are used synonymously in these examples and correspond to wireless devices, e.g. the wireless devices 120-1 . . . 120-N.

In action 301 and action 302, that are exemplifying Action 201 above, STAs associated with common properties, e.g. that require same properties, are grouped together and two or more of these STAs are selected. The selected STAs correspond to the identified wireless devices 120-1 . . . 120-K in Action 201.

The PHY header in a S1G_1M PPDU does not contain an address or ID field, unlike the SHORT and LONG formats which do contain fields pointing at the intended recipient(s) of the PPDU. In order to be able to multiplex several users into one PPDU, it should be ensured that the single user PHY header of the S1G_1M PPDU is compatible with all the users. The grouping of action 301 is performed by the transmitter, usually an AP or a relay, and is a process of choosing users whose data may be multiplexed into one single S1G_1M PPDU. The grouping may be based on the following pre-conditions:

1. All STAs in a group shall use the same channel bandwidth. E.g. that all STAs in a group shall have a 1 MHz channel bandwidth.
2. All STAs in a group shall have the same number of space-time streams. In a typical application all STAs have one space time stream.
3. All STAs in a group shall use the same guard interval (short or normal). In a typical application all STAs use the normal guard interval.
4. All STAs in a group shall use the same type of channel coding, such as Binary Convolutional Code (BCC) or Low Density Parity Check Code (LDPC). In a typical application all STAs employ binary convolutional codes.
5. All STAs in a group shall use the same type of space-time block code. In a typical application none of the STAs employ space-time codes.
6. All STAs in a group shall employ the same MCS. This typically requires that the transmitter estimates the required MCS for several STAs. This may only be accomplished by obtaining channel state information about the STAs. In a typical application a rate adaptation algorithm using ACK's from the STAs and possibly other feedback from the STAs is used to estimate the required MCS.
7. All STAs in a group shall employ the same aggregation. E.g., user may be grouped only if all have aggregation OFF. When aggregation ON, the Aggregated MAC Protocol Data Unit (A-MPDU) contains several MSDUs together with their respective MAC headers. Thus, aggregation may primarily be used for large packets.

Pre-condition 6 implies that only STAs with the same radio channel quality should be grouped. The transmitter should then evaluate the MCS for several or all STAs, store them in memory and group only STAs requiring the same MCS.

Further, the following pre-condition may optionally be used in order to decide whether to group STAs or not:

8. All STAs in a group shall be 802.11ah sensor type STAs. Note that the sensor type STA is a new class introduced in 802.11ah.

Moreover, the transmitter device may group the STAs by checking that the pre-conditions 1-7 above (or 1-8 if pre-condition 8 is used) are met by a set of two or more STAs which then are grouped. The transmitter device may store groups identified in this way in memory. Alternatively, the transmitter may first determine which STAs among the STAs for which there are buffered data and then it is checked if these may be grouped by checking preconditions 1-7 (or 1-8 if pre-condition 8 is used).

Pre-condition 6 may be optional and instead the lowest MCS used in the group, i.e. the MCS with the lowest code rate, may be is identified and the data for STAs using higher MCS are re-packaged using the lowest MCS used in the group.

After actions 301-302 there thus exist two or more grouped users or STAs that correspond to the wireless devices 120-1 . . . 120-K discussed above.

Then, in action 303 that is exemplifying Action 202 and Action 203 above, a multi-user PPDU is formed or formatted, which PPDU has a single-user preamble in contrast to conventional multi-user PPDUs that have a multi-user preamble. The multi-user PPDU corresponds to the single data packet above. The multi-user PPDU may be prepared as follows, where all the users share a common, i.e. the same, single user preamble. In the following it is assumed that the common preamble follows the S1G_1M preamble format as specified in IEEE 802.11ah D3.0 regarding 1 MHz PHY, referred to as "the 802.11ah spec" or simply "the spec" in the following. This preamble has much lower overhead than conventional and standardized multi-user preambles. Hence, with reference to said S1G_1M preamble, the following are examples of how the multi-user PPDU may be formed, including how a preamble based on the S1G_1M preamble format may be formatted:

Short Training Field (STF) and Long Training Field 1 (LTF1)

The STF and LTF1 may constructed according to the 802.11ah spec for single user, e.g. for the first user.

SIGnal field 1 (SIG-1) and SIG-2

SIG-1 and SIG-2 may be constructed according to the 802.11ah spec for a single user, for example the first user. When grouping is performed as above, the SIG-1 and SIG-2 fields are identical for all users. If all users employ binary convolutional codes then Bit 4 of SIG1 is set to 0. According to the spec, this bit is reserved and equal to 1. This bit may thus be used to signal the use S1G_1M MU-MIMO to the receiver device. An example alternative is to use Bit 6 of SIG2 or define new MCS, there are 4 bits for the MCS but only 11 MCS's.

SIG-3 and SIG-4

SIG-3 and SIG-4 contain the length, response indication and smoothing fields.

The length field in SIG-3 and SIG-4 (bits 12 to 20) are computed for each user independently, according to the 802.11ah spec. The length field of the multi-user PPDU is the maximum of the length fields for all users.

The response indication field indicates the presence and type of frame a SIFS after the current frame transmission. It is an enhancement to the virtual carrier sensing mechanism in 802.11. It is intended for early ACK indication and used by other STAs to save power and correctly defer channel access. The response indication field is computed for each user independently, according to the 802.11ah spec. The response indication field of the multi-user PPDU is the maximum of the response indications for all users. This means that if not all the response indications are equal then the most conservative value is chosen, to ensure that other STAs defer correctly.

The smoothing field of the multi-user PPDU is set to the minimum of the smoothing fields of all the users. In other words, if all users have the same value for the smoothing field, then that value is used in the smoothing field of the multi-user PPDU (bit 23 in SIG-4). Otherwise, if there is at least one user for which smoothing is not recommended, then the smoothing field of the multi-user PPDU is set to 0 (smoothing not recommended). A simple alternative is to group users utilizing the same smoothing recommendation, but it is not strictly necessary.

SIG-5

SIG-5 contains Doppler, NDP indication and CRC fields.

If one or more users do not support traveling pilot tone allocation, the Doppler field of the multi-user PPDU is set to 0 (regular pilot tone allocation). Otherwise, if the Doppler bits are equal for all users, then this common value is assigned to the Doppler field of the multi-user PPDU. Otherwise the Doppler field of the multi-user PPDU is set to 1 (indicating traveling pilot tone allocation). A simple alternative is to group users utilizing the same pilot tone allocation, but it is not necessary.

The NDP indication field in the multi-user PPDU is set to 0. It is assumed that only users with payload to be transmitted are grouped, so that control NDP frames are excluded from the multi-user PPDUs.

The 4 bit CRC is computed according to the 802.11ah spec, using as input bits 0-24 of the multi-user PPDU.

Duration Field

MPDUs encapsulate the MSDUs with the user data together with their respective MAC headers. The MAC header of each MPDU contains a duration field. One of the MPDU's may be (arbitrarily) chosen and its duration field be modified to contain the sum of the durations of the MPDUs of all users, provided this sum is less than the maximum possible value of the duration field. This is done in order to ensure that the NAV is set correctly by all receiving STAs that can correctly decode the MAC header of the packet, including STAs not in accordance with embodiments herein.

MPDUs

The MPDUs for all users are coded using the channel code indicated in the MCS field in the SIG-2 of the multi-user PPDU. The coded users' MSDUs and their coded MAC headers may be concatenated. Concatenation may be performed in several ways. For example, the MAC headers are placed in series. If one MAC header duration field contains the sum of all duration fields, as discussed above, this MAC header is placed first. The data fields, i.e. the MSDU, may also be placed in series after the MAC headers, and in the same order as the MAC headers, e.g.:

|MAC HEADER USER1|MAC HEADER USER2| . . . |DATA USER 1|DATA USER2| . . . |, where the duration field in the MAC header for USER 1 may contain the total duration of the aggregation of MSDUs and their headers.

In another example the users' MPDUs are concatenated in series. If one MAC header's duration field of one MPDU contains the sum of all duration fields, as discussed above, this MPDU is placed first, e.g.:

|MAC HEADER USER1|DATA USER1|MAC HEADER USER2|DATA USER2| . . . |, where the duration field in the MAC header for USER1 may contain the total duration of the aggregation of MPDUs.

In yet another example, the users' MPDUs are interleaved.

Code Bits

The users' code bits are mapped to symbols from a symbol constellation.

The user code bits from each user may be mapped separately to a stream of symbols from a symbol constellation. For example, the code bits of a first user may be mapped to a first stream of BPSK symbols, and the user bits from a second user are mapped to a second stream of BPSK symbols.

In another example, user bits from at least two users are mapped to one symbol of a symbol constellation. For example, if the MPDUs have been interleaved, as discussed above, then a first bit from a first user may be paired with a second bit from a second user and the pair of bits is mapped to one QPSK symbol, or more generally to one symbol of a symbol constellation.

Pilots

Pilots are inserted as indicated by bit 24 in the SIG (regular or traveling pilot allocation).

Baseband Waveform

The baseband waveform, associated with baseband processing including e.g. Inverse Fast Fourier Transform (IFFT), Cyclic Prefix (CP) insertion, etc., is generated according to the 802.11ah specification for a single user PPDU.

In action 304 that is exemplifying Action 204 above, the formed multi-user PPDU is transmitted for reception by the STAs, where one of the STAs may correspond to the receiving device for which the exemplary actions are shown in FIG. 4.

The actions of FIG. 4 will now be discussed, starting when the receiver device has listened for, found and received the multi-user PPDU.

In action 401, the receiver device detects the type of PPDU based on the PHY header. The receiver device typically synchronizes and estimates the channel based on the STF and LTF. Then it decodes the SIG. The SIG can be read by all STAs. In action 402 it is then checked if the PPDU is a multi-user PPDU or not, i.e. a PPDU as discussed above in connection with FIG. 3 and actions 302-304, and thus that MU-MIMO is employed. If e.g. Bit 3=0, Bit 4=0 in SIG1 then STAs, including e.g. the receiver device in this example, implementing embodiments herein can detect the PPDU is a multi-user PPDU.

Actions 401-402 are exemplifying Action 205 above.

If the PPDU is not a multi-user PPDU, then in action 403 the receiver device may proceed as conventionally, e.g. read MAC header and extract payload. If on the other hand the PPDU is a multi-user PPDU, then it is in action 404, exemplifying Action 206 above, determined if the multi-user PPDU contains one or more MPDUs addressed to the receiver device. The receiver device may equalize, demodulate and decode the MAC headers and then read the MAC headers for all users and determine whether the multi-user PPDU contains an MPDU destined for the receiver device by reading a destination address in the MAC header. If the first MAC header contains the total duration of the aggregated data for several users, as discussed above, the duration of the first MPDU may be determined from the total duration by subtraction of the durations of the remaining MPDUs. The receiver device determines the location of the MPDU or MPDUs directed to it. In action 405, exemplifying Action 207 above, the receiver device extracts its data from the MPDU or MPDUs directed to it.

Attention is drawn to that principles and many details of the detailed techniques described above may be used also for other types of PPDU's, e.g. the ones in IEEE 802.11ah discussed above and that have larger bandwidths than 1 MHz, although there are some differences:

The preamble of the SHORT type of PPDU also contains a reserved bit (set to 1) in Bit 0 of the SIG1. Setting this bit to 0 could be used to indicate a variant of the multi-user PPDU according to embodiments herein but that is based on the SHORT type of PPDU instead of the S1G_1M type of PPDU.

When the channel bandwidth is larger than 1 MHz, the PHY header contains a 9 bit ID field which gives an abbreviated indication of the intended recipient of the PPDU. If MU-MIMO according to embodiments herein is used then instead of the ID, a 6 bit group ID may instead be used. Group IDs are standardized in 802.11ah for MU-MIMO. The 3 remaining bits may be chosen by the transmitter device, e.g. AP, so that the 9 bits (6 Group ID+3 spare) do not coincide with the ID of an STA associated with, e.g. wirelessly connected to, the received device, e.g. AP.

In brief, using same naming as used in the detailed examples given above in relation to FIG. 3 and FIG. 4, embodiments herein enable the multiplexing of two (or more) S1G_1M users in a single PPDU, thereby accomplishing a multi-user PPDU that allows a more efficient utilization of the air interface. Simplified, embodiments herein may be exemplified by two steps:

Grouping the users to be multiplexed into one PPDU using channel state information corresponding to the radio links between STAs and an AP. This step e.g. includes how to choose the users to multiplex into one single multi-user PPDU.

Formatting of the PPDU e.g. by re-using a single-user PPDU format, such as of the S1G_1M type, in order to:
Make the PPDU format compatible with STAs not implementing embodiments herein, e.g. prior art STAs.
Make the PPDU format compatible with single-user IEEE 802.11ah receiver algorithms, including synchronization, Automatic Gain Control (AGC), frequency correction, channel estimation, equalization, demodulation and decoding. This step includes how to construct the multi-user PPDU.

Further, implementations of embodiments herein are able to co-exist with IEEE 802.11ah overlapping Basic Service Sets (BSS). In particular, it is desirable to avoid the so called hidden node problem, which requires a virtual carrier sensing mechanisms in IEEE 802.11ah, e.g. RID, NAV, to work, even in the case of multi-user PPDU's as presented herein. It is possible to mix STAs implementing embodiments herein with STAs that are not, even within the same BSS, while ensuring that the channel contention and channel deferral mechanisms work correctly. In this way the embodiments herein may be implemented in proprietary solutions that co-exist with standardized solutions, or if a future standardization may cover embodiments herein, embodiment herein would be backward compatible with previous versions of the standard, e.g. IEEE 802.11ah.

The following is a numerically based example showing some of the benefits of embodiments herein:

Assume a WLAN based on the IEEE 802.11ah standard and that is using a 1 MHz channel bandwidth. Suppose that an AP needs to transmit to two STAs. It is also assumed that both STAs require MCS1 (using QPSK modulation and code rate 1/2), and both have a payload occupying 4 OFDM symbols. The preamble occupies 14 OFDM symbols, the short MAC header (14 bytes) and the CRC occupy 6 OFDM symbols. According to the prior art, i.e. using two independent transmissions according to the 802.11ah standard, the AP would employ two independent transmissions, requiring a total of 2*(14+6+4)=48 OFDM symbols. According to embodiments herein, the AP will group the two STAs. MCS1 modulation and coding is used. Hence, the total number of OFDM symbols needed is 14+6*2+4*2=34 OFDM symbols. Hence, the air time is reduced by 29% and there is less overhead. For example, in the prior art, without embodiments herein, it takes a given time to transmit two packets to two users, e.g. time measured in seconds. Thanks to embodiments herein the data can instead be packed in one packet with a preamble that in size can be the same as for one of said two packets, and it takes 29% less time to transmit the same data to said two users. There are also savings in Short Inter Frame Spacing (SIFS) and backoff time, and the latency for one of the users is also reduced. The link performance may be the same, since both prior art and embodiments herein may employ MCS1 modulation and coding.

Figure 5:
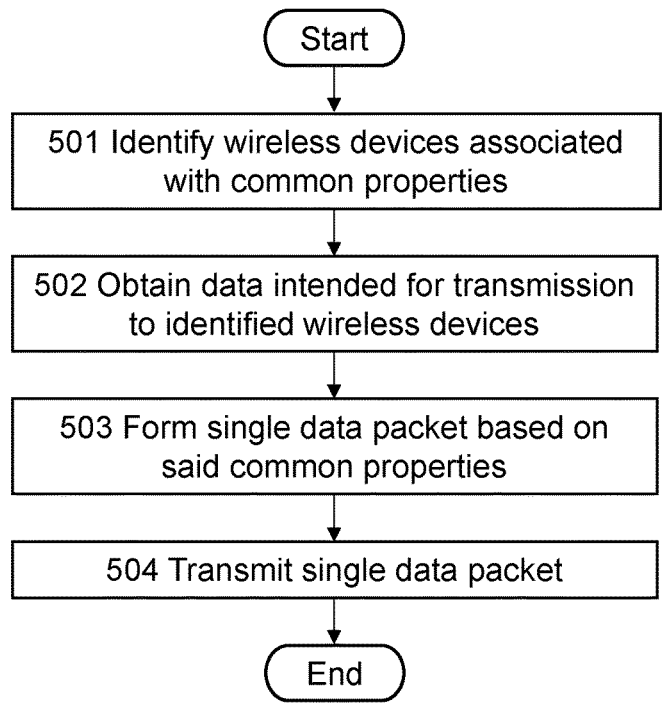
FIG. 5 is another flowchart schematically illustrating embodiments of a method performed in the radio network node.

FIG. 5 is a flow chart schematically illustrating embodiments of a method, performed by a radio network node, e.g. the radio network node 110, for transmitting data to wireless devices, e.g. the wireless devices 120-1 . . . 120-K, that are wirelessly connected to the radio network node 110. The radio network node and the wireless devices being are comprised in a WLAN, e.g. the WLAN 100.

The method comprises the following actions, which actions may be taken in any suitable order and/or be carried out fully or partly overlapping in time when this is possible and suitable.

Action 501

The radio network node 110 identifies wireless devices, here the wireless devices 120-1 . . . 120-K, that are associated with common properties of one or more predetermined property types.

In some embodiments, said one or more predetermined property types comprises a type based on downlink channel quality.

Furthermore, in some embodiments, said one or more predetermined property types comprises one or more types for indicating one or more of the following:
- channel bandwidth for wireless communication with the radio network node 110,
- modulation and coding scheme,
- number of space-time streams,
- guard interval,
- type of channel coding,
- employment regarding aggregation of MAC PDUs.

Moreover, in some embodiments, said one or more predetermined property types comprise a type for indicating a type of wireless device.

This action may fully or partly correspond to Action 201 and Actions 301-302 described above.

Action 502

The radio network node 110 obtains data intended for transmission to the identified wireless devices, where different parts of the data is intended for transmission to different wireless devices.

This action may fully or partly correspond to Action 202 and Action 303 described above.

Action 503

The radio network node 110 forms a single data packet based on said common properties and that comprises the obtained data. The single data packet is such associated with a packet type directed to deliver data to only a single wireless device.

The single data packet may comprises a preamble portion of a single-user type and a data portion comprising the obtained data.

In some embodiments, the single data packet comprises a preamble portion and a data portion comprising the obtained data, which preamble portion is valid for all the identified wireless devices 120-1 . . . 120-K based on that the identified wireless devices 120-1 . . . 120-K are associated with said common properties.

Furthermore, in some embodiments, the single data packet comprises a preamble portion and a data portion, which data portion comprises the obtained data and identifiers associated with the obtained data. The identifiers enable each one of the identified wireless devices 120-1 . . . 120-K to identify which part or parts of the data that are intended for it. At least one of the identifiers may be arranged in the data portion as an identifier would have been arranged if the data portion would comprise data for a only a single wireless device.

Moreover, in some embodiments, the single data packet comprises a preamble portion and a data portion comprising the obtained data. The preamble portion comprises an indicator indicating that the data portion comprises data for multiple wireless devices.

Also, in some embodiments, said one or more predetermined property types are based on what is indicated in the preamble portion according to a predetermined type of the single data packet.

The WLAN 100 may advantageously be based on the IEEE 802.11ah standard and the single data packet may advantageously be of a S1G_1M type.

This action may fully or partly correspond to Action 203 and Action 303 described above.

Action 504

The radio network node 110 transmits the single data packet on a communication channel that is accessed by all of the identified wireless devices 120-1 . . . 120-K.

This action may fully or partly correspond to Action 204 and Action 304 described above.

Figure 6:
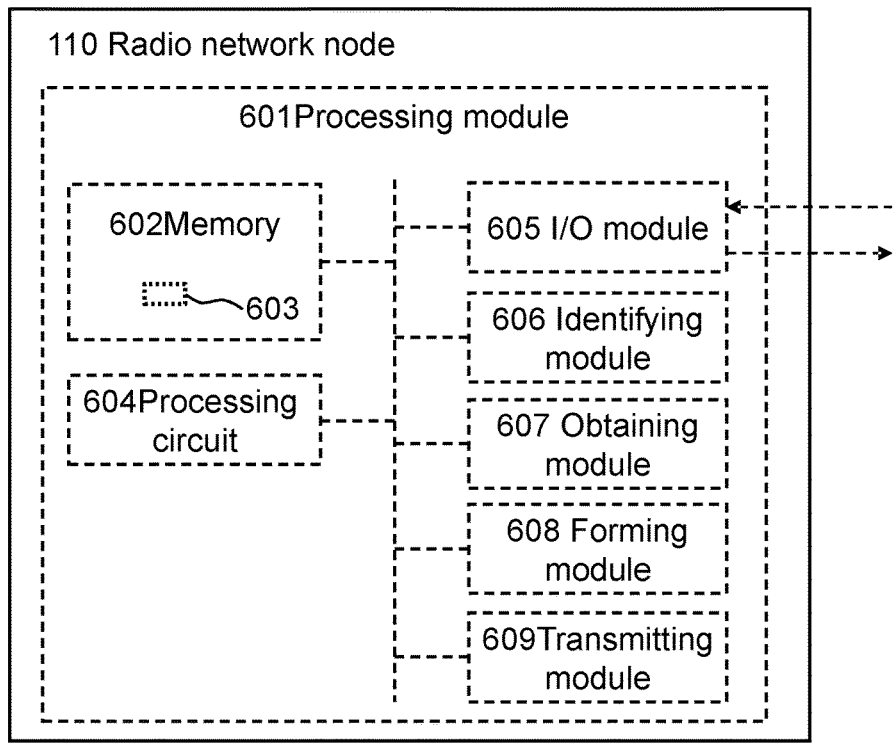
FIG. 6 is a functional block diagram for illustrating embodiments of the radio network node.

FIG. 6 is a schematic block diagram for illustrating embodiments of the radio network node 110 mentioned above in connection with FIG. 5, for transmitting data to the wireless devices 120-1 . . . 120-K, which as mentioned above are wirelessly connected to the radio network node 110 and comprised in the WLAN 100. The radio network node 110 is configured to be comprised in the WLAN 100. FIG. 6 is particular for showing how the serving radio network node 110 further may be configured to perform the method and actions discussed above in connection with FIG. 5.

The radio network node 110 may comprise a processing module 601, such as a means, one or more hardware modules, including e.g. one or more processors, and/or one or more software modules for performing said methods and/or actions.

The serving radio network node 110 may further comprise a memory 602 that may comprise, such as contain or store, a computer program 603. The computer program comprises 'instructions' or 'code' directly or indirectly executable by the radio network node 110 so that it performs the said methods and/or actions. The memory 602 may comprise one or more memory units and may be further be arranged to store data, such as configurations and/or applications involved in or for performing functions and actions of embodiments herein.

Moreover, the radio network node 110 may comprise a processing circuit 604 as an exemplifying hardware module and may comprise or correspond to one or more processors. In some embodiments, the processing module 601 may comprise, e.g. 'is embodied in the form of' or 'realized by' the processing circuit 604. In these embodiments, the memory 602 may comprise the computer program 603 executable by the processing circuit 604, whereby the radio network node 110 is operative, or configured, to perform said method and/or actions.

Typically the radio network node 110, e.g. the processing module 601, comprises an Input/Output (I/O) module 605, configured to be involved in, e.g. by performing, any communication to and/or from other units and/or nodes, such as sending and/or receiving information to and/or from other external nodes or devices. The I/O module 605 may be exemplified by an obtaining, e.g. receiving, module and/or a providing, e.g. sending, module, when applicable.

In further embodiments, the radio network node 110, e.g. the processing module 501, may comprise one or more of an identifying module 606, an obtaining module 607, a forming module 608 and a transmitting module 609 as exemplifying hardware and/or software module(s). In some embodiments, the identifying module 606, the obtaining module 607, the forming module 608 and the transmitting module 609 may be fully or partly implemented by the processing circuit 604.

Therefore, according to the various embodiments described above, the radio network node 110, and/or the processing module 601 and/or the identifying module 606 are operative, or configured, to identify said wireless devices, i.e. here the wireless devices 120-1 . . . 120-K, associated with common properties of one or more predetermined property types.

Further, according to the various embodiments described above, the radio network node 110, and/or the processing module 601 and/or the obtaining module 607 may be operative, or configured, to obtain said data intended for transmission to the identified wireless devices 120-1 . . . 120-K, with different parts of the data being intended for transmission to different wireless devices.

Moreover, according to the various embodiments described above, the radio network node 110, and/or the processing module 601 and/or the forming module 608 are operative, or configured, to form said single data packet based on said common properties and comprising the obtained data. As mentioned above, the single data packet is associated with a packet type directed to deliver data to only a single wireless device.

Furthermore, according to the various embodiments described above, the radio network node 110, and/or the processing module 601 and/or the transmitting module 609 are operative, or configured, to transmit the single data packet on said communication channel being accessed by all of the identified wireless devices 120-1 . . . 120-K.

Figure 7:
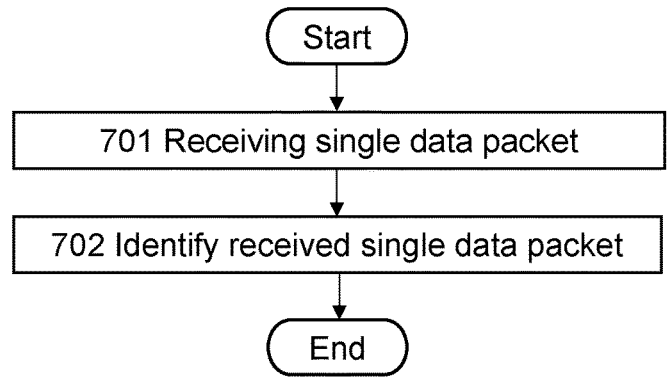
FIG. 7 is a another flowchart schematically illustrating embodiments of a method performed in the wireless device.

FIG. 7 is a flow chart schematically illustrating embodiments of a method, performed by a wireless device, e.g. the wireless device 120-1, for managing data from a radio network node, e.g. the radio network node 110. As mentioned before, the wireless device 120-1 is wirelessly connected to the radio network node 110. The radio network node 110 and the wireless device 120-1 being comprised in a WLAN, e.g. the WLAN 100.

The method comprises the following actions, which actions may be taken in any suitable order and/or be carried out fully or partly overlapping in time when this is possible and suitable.

Action 701

The wireless device 120-1 receives, from the radio network node 110, a single data packet on a communication channel accessible by a group of wireless devices, e.g. the wireless devices 120-1 . . . 120-K, comprising the wireless device 120-1 and one or more further wireless devices, e.g. the wireless devices 120-2 . . . 120-K. The group of wireless devices 120-1 . . . 120-K also being wirelessly connected to the radio network node 110.

This action may fully or partly correspond to Action 204 described above.

Action 702

The wireless device 120-1 identifies the received single data packet as a single data packet that has been formed based on common properties that the wireless devices 120-1 . . . 120-K in said group are associated with. The common properties are of one or more predetermined property types. The single data packet comprises data intended for receipt by said group of wireless devices 120-1 . . . 120-K, with different parts of the data being intended for receipt by different wireless devices. The single data packet is associated with a packet type directed to deliver data to only a single wireless device.

In some embodiments, said one or more predetermined property types comprises a type based on downlink channel quality.

Furthermore, in some embodiments, said one or more predetermined property types comprises one or more types for indicating one or more of the following:

channel bandwidth for wireless communication with the radio network node 110, modulation and coding scheme, number of space-time streams, guard interval, type of channel coding, employment regarding aggregation of MAC PDUs.

Moreover, in some embodiments, said one or more predetermined property types comprise a type for indicating a type of wireless device.

Further, in some embodiments, the single data packet comprises a preamble portion of a single-user type and a data portion comprising the data.

In some embodiments, the single data packet comprises a preamble portion and a data portion comprising the data, which preamble portion is valid for all the wireless device in the group of wireless devices 120-1 . . . 120-K based on that these wireless devices 120-1 . . . 120-K are associated with said common properties.

Also, in some embodiment the single data packet comprises a preamble portion and a data portion, which data portion comprises the data and identifiers associated with the data. The identifiers enable each one of the wireless devices in the group of wireless devices 120-1 . . . 120-K to identify which part or parts of the data that are intended for it. At least one of the identifiers may be arranged in the data portion as an identifier would have been arranged if the data portion would comprise data for a only a single wireless device.

Furthermore, in some embodiments, said one or more predetermined property types are based on what is indicated in the preamble portion according to a predetermined type of the single data packet.

Moreover, in some embodiments, the single data packet comprises a preamble portion and a data portion comprising the data, which preamble portion comprises an indicator indicating that the data portion comprises data for multiple wireless devices.

The WLAN 100 may advantageously be based on the IEEE 802.11ah standard and the single data packet may advantageously be of a S1G_1M type.

This action may fully or partly correspond to Action 205 and Actions 401-402 described above.

Figure 8:
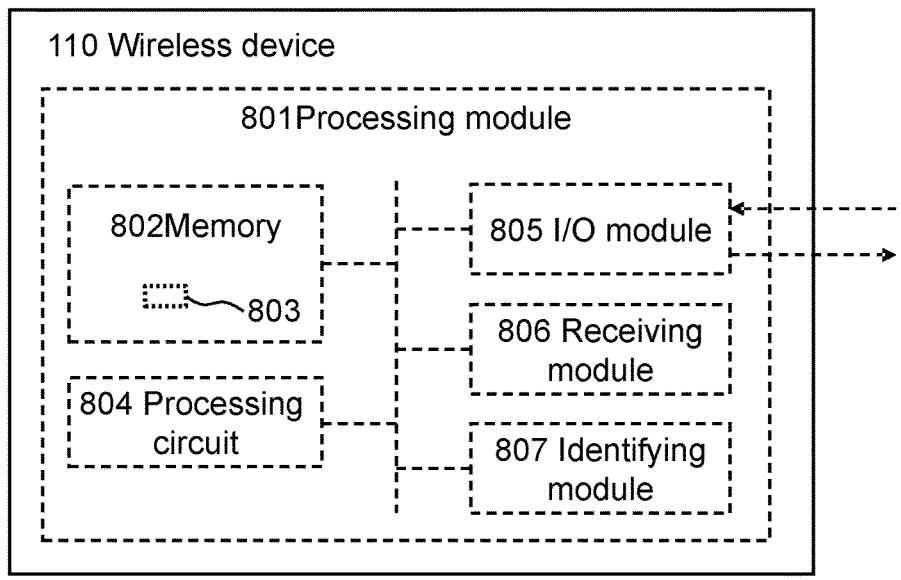
FIG. 8 is a functional block diagram for illustrating embodiments of the wireless device.

FIG. 8 is a schematic block diagram for illustrating embodiments of the wireless device 120-1 mentioned above in connection with FIG. 7, for managing data from the radio network node 110. The wireless device 120-1 is configured to be comprised in the WLAN 100 and be wirelessly connected to the radio network node 110. FIG. 8 is particular for showing how the wireless device 120-1 further may be configured to perform the method and actions discussed above in connection with FIG. 7.

The wireless device 120-1 may comprise a processing module 801, such as a means, one or more hardware modules, including e.g. one or more processors, and/or one or more software modules for performing said methods and/or actions.

The wireless device 120-1 may further comprise a memory 802 that may comprise, such as contain or store, a computer program 803. The computer program comprises 'instructions' or 'code' directly or indirectly executable by the wireless device 120-1 so that it performs the said methods and/or actions. The memory 802 may comprise one or more memory units and may be further be arranged to store data, such as configurations and/or applications involved in or for performing functions and actions of embodiments herein.

Moreover, the wireless device 120-1 may comprise a processing circuit 804 as an exemplifying hardware module and may comprise or correspond to one or more processors. In some embodiments, the processing module 801 may comprise, e.g. 'is embodied in the form of' or 'realized by' the processing circuit 804. In these embodiments, the memory 802 may comprise the computer program 803 executable by the processing circuit 804, whereby the wireless device 120-1 is operative, or configured, to perform said method and/or actions.

Typically the wireless device 120-1, e.g. the processing module 801, comprises an Input/Output (I/O) module 805, configured to be involved in, e.g. by performing, any communication to and/or from other units and/or nodes, such as sending and/or receiving information to and/or from other external nodes or devices. The I/O module 805 may be exemplified by an obtaining, e.g. receiving, module and/or a providing, e.g. sending, module, when applicable.

In further embodiments, the wireless device 120-1, e.g. the processing module 801, may comprise one or more of an receiving module 806 and an identifying module 807 as exemplifying hardware and/or software module(s). In some embodiments, the receiving module 806 and the identifying module 807 may be fully or partly implemented by the processing circuit 804.

Therefore, according to the various embodiments described above, the wireless device 120-1, and/or the processing module 801 and/or the receiving module 806 are operative, or configured, to receive, from the radio network node 110, the single data packet on said communication channel accessible by the group of wireless devices 120-1 . . . 120-K. Said group thus comprises the wireless device 120-1 and one or more further wireless devices 120-2 . . . 120-K wirelessly connected to the radio network node 110. Further, according to the various embodiments described above, the wireless device 120-1, and/or the processing module 801 and/or the identifying module 807 may be operative, or configured, to identify the received single data packet as a single data packet that has been formed based on common properties that the wireless devices 120-1 . . . 120-K in said group are associated with. As discussed already, the common properties are of one or more predetermined property types. Said single data packet comprises the data intended for receipt by said group of wireless devices 120-1 . . . 120-K. Different parts of the data are intended for receipt by different wireless devices and the single data packet is associated with a packet type directed to deliver data to only a single wireless device.

Figure 9A:
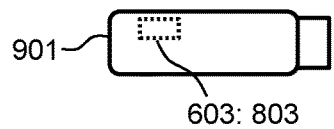
FIGS. 9*a-c* are schematic drawings illustrating embodiments relating to computer program products and computer programs to cause the radio network node and the wireless device to perform method actions.
Figure 9B:
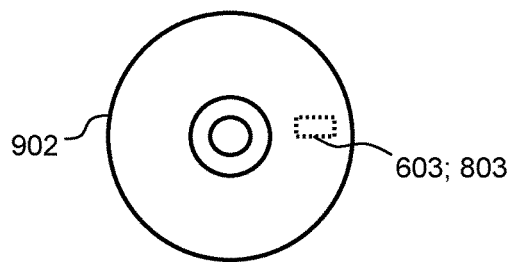
Figure 9C:
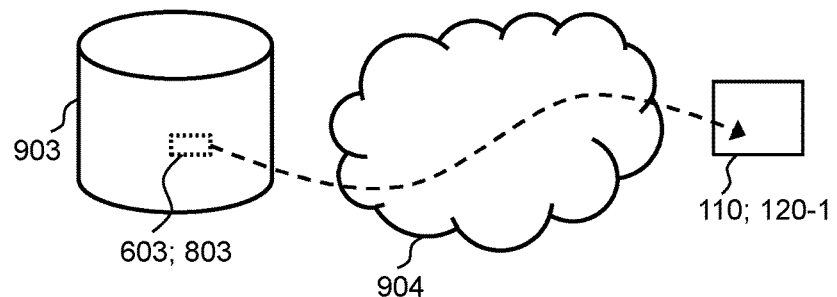

FIGS. 9*a-c* are schematic drawings illustrating embodiments relating to a computer program that may be any one of the computer programs 603, 803 and that comprises instructions that when executed by the processing circuits 604, 804 respectively and/or the processing modules 601, 801 respectively, causes the radio network node 110 and/or the wireless device 120-1 to perform as described above.

In some embodiments there is provided a data carrier, e.g. a computer program product, comprising any one or both of the computer programs 603, 803. The data carrier may be one of an electronic signal, an optical signal, a radio signal, and a computer readable medium. Any one or both of the computer programs 603, 803 may thus be stored on the computer readable medium. By data carrier may be excluded a transitory, propagating signal and the data carrier may correspondingly be named non-transitory data carrier. Non-limiting examples of the data carrier being a computer-readable medium is a memory card or a memory stick 901 as in FIG. 9*a*, a disc storage medium 902 such as a CD or DVD as in FIG. 9*b*, a mass storage device 903 as in FIG. 9*c*. The mass storage device 903 is typically based on hard drive(s) or Solid State Drive(s) (SSD). The mass storage device 903 may be such that is used for storing data accessible over a computer network 904, e.g. the Internet or a Local Area Network (LAN).

Any one or both of the computer programs 603, 803 may furthermore be provided as a pure computer program or comprised in a file or files. The file or files may be stored on the computer-readable medium and e.g. available through download e.g. over the computer network 904, such as from the mass storage device 903 via a server. The server may e.g. be a web or File Transfer Protocol (FTP) server. The file or files may e.g. be executable files for direct or indirect download to and execution on the radio network node 110 and/or the wireless device 120-1, e.g. by any one or both of the processing circuits 604, 804. The file or files may also or alternatively be for intermediate download and compilation involving the same or another processor to make them executable before further download and execution causing the radio network node 110 and/or the wireless device 120-1 to perform the method as described above.

Note that any processing module(s) mentioned in the foregoing may be implemented as a software and/or hardware module, e.g. in existing hardware and/or as an Application Specific integrated Circuit (ASIC), a Field-Programmable Gate Array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analog and digital circuits, and/or one or more processors configured with software and/or firmware, e.g. stored in memory, that, when executed by the one or more processors make the radio network node 110 and/or the wireless device 120-1 to be configured to and/or to perform the above-described methods, respectively.

The term "radio network node" as used herein may as such refer to any type of network node capable of serving a wireless device, e.g. STA, and/or that are connected to other network node(s) or network element(s) or any radio node from which a wireless device receives signals.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that enumerating terminology such as first network node, second network node, first wireless device, second wireless device, etc., as such should be considering non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. Also, "number", "value" may be represented by a bit string.

As used herein, the expression "in some embodiments" has been used to indicate that the features of the embodiment described may be combined with any other embodiment disclosed herein.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of uni-casting, one specifically addressed device may receive and encode the transmission. In case of group-casting, e.g. multi-casting, a group of specifically addressed devices may receive and decode the transmission.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method, performed by a radio network node, for transmitting data to wireless devices that are wirelessly connected to the radio network node, the radio network node and the wireless devices being comprised in a Wireless Local Area Network (WLAN), wherein the method comprises:
identifying wireless devices that are associated with common properties, the common properties being one or more predetermined property types;
obtaining data intended for transmission to the identified wireless devices, different parts of the data being intended for transmission to different wireless devices;
forming a single data packet based on said common properties and comprising the obtained data, wherein the single data packet is associated with a packet type directed to deliver data to only a single wireless device, wherein the single data packet comprises a single-user type preamble portion and a data portion comprising the obtained data, wherein the single-user type preamble portion comprises an indicator indicating that the data portion comprises data for multiple wireless devices, wherein the data portion comprises the obtained data and identifiers associated with the obtained data in sub-data units, wherein the single-user type preamble portion is valid for all the identified wireless devices based on the identified wireless devices being associated with said common properties, and wherein the identifiers enable each one of the identified wireless devices to identify the part of the data that is intended for said each one of the identified wireless devices; and
transmitting the single data packet on a communication channel being accessed by all the identified wireless devices.

2. The method as claimed in claim 1, wherein at least one of the identifiers is arranged in the data portion when the data portion comprises data for only a single wireless device.

3. The method as claimed in claim 1, wherein said one or more predetermined property types are based on what is indicated in the single-user type preamble portion according to a predetermined type of the single data packet.

4. The method as claimed in claim 1, wherein said one or more predetermined property types comprise a type based on downlink channel quality.

5. The method as claimed in claim 1, wherein said one or more predetermined property types comprise one or more types for indicating one or more of the following:
channel bandwidth for wireless communication with the radio network node,
modulation and coding scheme,
number of space-time streams,
guard interval,
type of channel coding, and
employment regarding aggregation of Medium Access Control (MAC) Protocol Data Units (PDUs).

6. The method as claimed in claim 1, wherein said one or more predetermined property types comprise a type for indicating a type of wireless device.

7. The method as claimed in claim 1, wherein the WLAN is based on an Institute of Electrical and Electronics Engineers' (IEEE) 802.11ah standard and the single data packet is of a S1G_1M type.

8. The method as claimed in claim 1, wherein each sub-data unit, in the single data packet, comprises a header, each header comprising an identifier of the identifiers, and a data field comprising a part of the data associated with the corresponding identifier.

9. A method, performed by a wireless device, for managing data from a radio network node, the wireless device being wirelessly connected to the radio network node, the radio network node and the wireless device being comprised in a Wireless Local Area Network (WLAN), wherein the method comprises:
receiving, from the radio network node, a single data packet on a communication channel accessible by a group of wireless devices comprising the wireless device and one or more further wireless devices, wherein the group of wireless devices are wirelessly connected to the radio network node; and identifying the received single data packet as the single data packet that has been formed based on common properties that the wireless devices in said group of wireless devices are associated with, said common properties being one or more predetermined property types, wherein said single data packet comprises data intended for receipt by said group of wireless devices, different parts of the data being intended for receipt by different wireless devices, wherein the single data packet is associated with a packet type directed to deliver data to only a single wireless device, wherein the single data packet comprises a single-user type preamble portion and a data portion comprising the data, wherein the single-user type preamble portion comprises an indicator indicating that the data portion comprises data for multiple wireless devices, wherein the data portion comprises the data and identifiers associated with the data in sub-data units, wherein the single-user type preamble portion is valid for all the wireless devices in the group of wireless devices based on the wireless devices being associated with said common properties, and wherein the identifiers enable each one of the wireless devices in the group of wireless devices to identify the part of the data that is intended for said each one of the wireless devices.

10. The method as claimed in claim 9, wherein at least one of the identifiers is arranged in the data portion when the data portion comprises data for only a single wireless device.

11. The method as claimed in claim 9, wherein said one or more predetermined property types are based on what is indicated in the single-user type preamble portion according to a predetermined type of the single data packet.

12. The method as claimed in claim 9, wherein said one or more predetermined property types comprise a type based on downlink channel quality.

13. The method as claimed in claim 9, wherein said one or more predetermined property types comprise one or more types for indicating one or more of the following:
channel bandwidth for wireless communication with the radio network node,
modulation and coding scheme,
number of space-time streams,
guard interval,
type of channel coding, and
employment regarding aggregation of Medium Access Control (MAC) Protocol Data Units (PDUs).

14. The method as claimed in claim 9, wherein said one or more predetermined property types comprise a type for indicating a type of wireless device.

15. The method as claimed in claim 9, wherein the WLAN is based on an Institute of Electrical and Electronics Engineers' (IEEE) 802.11ah standard and the single data packet is of a S1G_1M type.

16. The method as claimed in claim 9, wherein each sub-data unit, in the single data packet, comprises a header, each header comprising an identifier of the identifiers, and a data field comprising a part of the data associated with the corresponding identifier.

17. A radio network node for transmitting data to wireless devices that are wirelessly connected to the radio network node and comprised in a Wireless Local Area Network (WLAN), the radio network node being configured to be comprised in the WLAN and further configured to:

identify wireless devices that are associated with common properties, the common properties being one or more predetermined property types;

obtain data intended for transmission to the identified wireless devices, different parts of the data being intended for transmission to different wireless devices;

form a single data packet based on said common properties and comprising the obtained data, wherein the single data packet is associated with a packet type directed to deliver data to only a single wireless device, wherein the single data packet comprises a single-user type preamble portion and a data portion comprising the obtained data, wherein the single-user type preamble portion comprises an indicator indicating that the data portion comprises data for multiple wireless devices, wherein the data portion comprises the obtained data and identifiers associated with the obtained data in sub-data units, wherein the single-user type preamble portion is valid for all the identified wireless devices based on the identified wireless devices being associated with said common properties, and wherein the identifiers enable each one of the identified wireless devices to identify the part of the data that is intended for said each one of the identified wireless devices; and transmit the single data packet on a communication channel being accessed by all the identified wireless devices.

18. The radio network node as claimed in claim 17, wherein at least one of the identifiers is arranged in the data portion when the data portion comprises data for only a single wireless device.

19. The radio network node as claimed in claim 18, wherein said one or more predetermined property types are based on what is indicated in the single-user type preamble portion according to a predetermined type of the single data packet.

20. The radio network node as claimed in claim 17, wherein said one or more predetermined property types comprise a type based on downlink channel quality.

21. The radio network node as claimed in claim 17, wherein said one or more predetermined property types comprise one or more types for indicating one or more of the following:
channel bandwidth for wireless communication with the radio network node,
modulation and coding scheme,
number of space-time streams,
guard interval,
type of channel coding, and
employment regarding aggregation of Medium Access Control (MAC) Protocol Data Units (PDUs).

22. The radio network node as claimed in claim 17, wherein said one or more predetermined property types comprise a type for indicating a type of wireless device.

23. The radio network node as claimed in claim 17, wherein the WLAN is based on an Institute of Electrical and Electronics Engineers' (IEEE) 802.11ah standard and the single data packet is of a S1G_1M type.

24. A wireless device for managing data from a radio network node, the wireless device being configured to be wirelessly connected to the radio network node, the radio network node being comprised in a Wireless Local Area Network (WLAN), wherein the wireless device is configured to be comprised in the WLAN, the wireless device comprising:
  a processor; and
  memory associated with the processor, the memory storing instructions that, when executed, cause the processor to:
    receive, from the radio network node, a single data packet on a communication channel accessible by a group of wireless devices, wherein the group of wireless devices comprises the wireless device and one or more further wireless devices that are wirelessly connected to the radio network node; and
    identify the received single data packet as the single data packet that has been formed based on common properties that the wireless devices in said group of wireless devices are associated with, said common properties being one or more predetermined property types, said single data packet comprising data intended for receipt by said group of wireless devices, different parts of the data being intended for receipt by different wireless devices, wherein the single data packet is associated with a packet type directed to deliver data to only a single wireless device, wherein the single data packet comprises a single-user type preamble portion and a data portion comprising the data, wherein the single-user type preamble portion comprises an indicator indicating that the data portion comprises data for multiple wireless devices, wherein the data portion comprises the data and identifiers associated with the data in sub-data units, wherein the single-user type preamble portion is valid for all the wireless devices in the group of wireless devices based on the wireless devices being associated with said common properties, and wherein the identifiers enable each one of the wireless devices in the group of wireless devices to identify the part of the data that is intended for said each one of the wireless devices.

25. The wireless device as claimed in claim 24, wherein at least one of the identifiers is arranged in the data portion when the data portion comprises data for only a single wireless device.

26. The wireless device as claimed in claim 24, wherein said one or more predetermined property types are based on what is indicated in the single-user type preamble portion according to a predetermined type of the single data packet.

27. The wireless device as claimed in claim 24, wherein said one or more predetermined property types comprise a type based on downlink channel quality.

28. The wireless device as claimed in claim 24, wherein said one or more predetermined property types comprise one or more types for indicating one or more of the following:
  channel bandwidth for wireless communication with the radio network node,
  modulation and coding scheme,
  number of space-time streams,
  guard interval,
  type of channel coding, and
  employment regarding aggregation of Medium Access Control (MAC) Protocol Data Units (PDUs).

29. The wireless device as claimed in claim 24, wherein said one or more predetermined property types comprise a type for indicating a type of wireless device.

30. The wireless device as claimed in claim 24, wherein the WLAN is based on an Institute of Electrical and Electronics Engineers' (IEEE) 802.11ah standard and the single data packet is of a S1G_1M type.

* * * * *